United States Patent
Lee et al.

(10) Patent No.: US 9,971,365 B2
(45) Date of Patent: May 15, 2018

(54) AIR CONDITIONER MANAGEMENT SYSTEM COMPRISING A USER INTERFACE DEVICE AND A CENTRAL MANAGEMENT DEVICE AND METHOD FOR CONTROLLING AIR CONDITIONER BY THE AIR CONDITIONER MANAGEMENT SYSTEM

(71) Applicant: LG ELECTRONICS INC., Seoul (KR)

(72) Inventors: Jongsoo Lee, Seoul (KR); Jinyoung You, Seoul (KR); Minjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 14/415,112

(22) PCT Filed: Jul. 24, 2013

(86) PCT No.: PCT/KR2013/006618
§ 371 (c)(1),
(2) Date: Jan. 15, 2015

(87) PCT Pub. No.: WO2014/017820
PCT Pub. Date: Jan. 30, 2014

(65) Prior Publication Data
US 2015/0192938 A1 Jul. 9, 2015

(30) Foreign Application Priority Data

Jul. 25, 2012 (KR) .................. 10-2012-0081058

(51) Int. Cl.
*F24F 11/00* (2018.01)
*G05D 23/19* (2006.01)
(Continued)

(52) U.S. Cl.
CPC .......... *G05D 23/1917* (2013.01); *F24F 11/00* (2013.01); *F24F 11/006* (2013.01);
(Continued)

(58) Field of Classification Search
CPC ..... G05D 23/1917; G06F 3/0484; G06F 3/00; G05B 15/02; F24F 11/00; F24F 11/006;
(Continued)

(56) References Cited

U.S. PATENT DOCUMENTS

| 6,595,430 B1* | 7/2003 | Shah | F23N 5/203 165/238 |
| 8,473,107 B2* | 6/2013 | Park | G06Q 50/06 340/12.37 |

(Continued)

FOREIGN PATENT DOCUMENTS

| JP | 05-149599 | 6/1993 |
| JP | 07-158924 | 6/1995 |

(Continued)

OTHER PUBLICATIONS

Advanced control systems engineering for energy and comfort management in a building environment —A review. Article. [online]. A.I. Dounis, 2009[retrieved on Nov. 3, 2016]. Retrieved from internet: <URL: http://www.sciencedirect.com/science/article/pii/S1364032108001457>.*

(Continued)

*Primary Examiner* — Darrin Dunn
*Assistant Examiner* — Marzia T Monty
(74) *Attorney, Agent, or Firm* — Lee, Hong, Degerman, Kang & Waimey

(57) ABSTRACT

An air conditioner management system and a method for controlling an air conditioner are disclosed. A user interface device provides a user interface to sense a user measure indicating a user opinion regarding operation of an air conditioner, generates feedback data associated with the sensed user measure, and transmits the generated feedback data. A central management device receives and stores the feedback data transmitted by the user interface device and (Continued)

calculates a set value to control the air conditioner based on the received feedback data and previously stored feedback data.

11 Claims, 7 Drawing Sheets

(51) Int. Cl.
 *G05B 15/02* (2006.01)
 *G06F 3/0484* (2013.01)
(52) U.S. Cl.
 CPC .......... *G05B 15/02* (2013.01); *G06F 3/0484* (2013.01); *F24F 2011/0057* (2013.01); *F24F 2011/0067* (2013.01); *F24F 2011/0071* (2013.01); *F24F 2011/0091* (2013.01)
(58) Field of Classification Search
 CPC ............... F24F 11/02; F24F 2011/0091; F24F 2011/0071; F24F 2011/0057; F24F 2011/0067
 See application file for complete search history.

(56) References Cited

U.S. PATENT DOCUMENTS

| | | | | |
|---|---|---|---|---|
| 8,693,494 B2* | 4/2014 | Fiatal | ................... | G06Q 30/02 370/449 |
| 2008/0191045 A1* | 8/2008 | Harter | .................. | F24F 11/0012 236/91 D |
| 2009/0140063 A1* | 6/2009 | Koster | ................... | F24F 11/006 236/51 |
| 2012/0031984 A1* | 2/2012 | Feldmeier | .............. | F24F 11/001 236/49.3 |
| 2012/0072030 A1* | 3/2012 | Elliott | .................. | F24F 11/0009 700/276 |
| 2012/0233478 A1* | 9/2012 | Mucignat | ............ | H04L 12/2825 713/320 |

FOREIGN PATENT DOCUMENTS

| JP | 2012-083001 | 4/2012 |
|---|---|---|
| KR | 10-2007-0072262 | 7/2007 |
| KR | 10-2010-0048195 | 5/2010 |

OTHER PUBLICATIONS

How people use thermostat in homes: A review. Article. [online]. Therese Peffer, 2011[retrieved on Nov. 3, 2016]. Retrieved from Internet: <URL: http://healthyheating.com/downloads/Thermostats/how_people_use_thermostats_in_homes.pdf>.*
PCT International Application No. PCT/KR2013/006618, Written Opinion of the International Searching Authority dated Oct. 16, 2013, 11 pages.

* cited by examiner

| IDENTIFIER | INPUT TIME | FEEDBACK DATA |
|---|---|---|
| 001 | 09 : 00 | 0001 |
| 002 | 09 : 00 | 0001 |
| 102 | 09 : 05 | 0001 |
| 001 | 09 : 05 | 0001 |
| 001 | 09 : 10 | 0001 |
| 001 | 09 : 15 | 0002 |
| 001 | 09 : 20 | 0002 |

| IDENTIFIER | BUILDING | ZONE |
|---|---|---|
| 001 | A | 1 |
| 002 | A | 2 |
| 101 | B | 1 |
| 102 | B | 2 |

| KIND | WEIGHT RULE |
|---|---|
| NUMBER-OF-PERSONS WEIGHT | A |
| TIME WEIGHT | B |
| COMMAND MEANING WEIGHT | C |
| MANAGER POLICY WEIGHT | D |

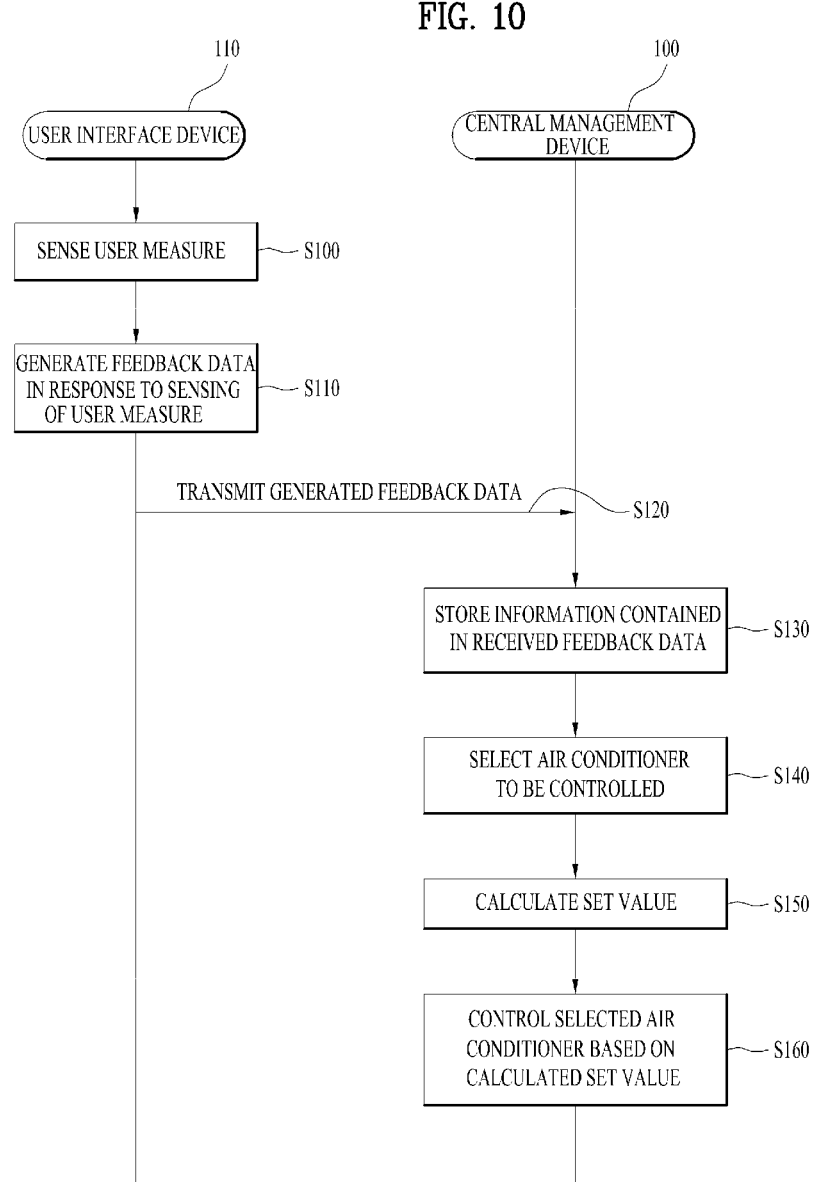

AIR CONDITIONER MANAGEMENT SYSTEM COMPRISING A USER INTERFACE DEVICE AND A CENTRAL MANAGEMENT DEVICE AND METHOD FOR CONTROLLING AIR CONDITIONER BY THE AIR CONDITIONER MANAGEMENT SYSTEM

CROSS-REFERENCE TO RELATED APPLICATIONS

This application is the National Stage filing under 35 U.S.C. 371 of International Application No. PCT/KR2013/006618, filed on Jul. 24, 2013, which claims the benefit of earlier filing date and right of priority to Korean Application No. 10-2012-0081058, filed on Jul. 25, 2012, the contents of which are all hereby incorporated by reference herein in their entirety.

TECHNICAL FIELD

The present invention relates to an air conditioner management system and a method for controlling an air conditioner and, more particularly, to an air conditioner management system to manage a plurality of air conditioners installed in different zones in a central integration management manner and a method for controlling the air conditioners.

BACKGROUND ART

An air conditioner includes a cooling unit to cool a surrounding space and a heating unit to heat the surrounding space. The air conditioner compresses, evaporates, and condenses a predetermined refrigerant to discharge cool air generated through heat exchange between the refrigerant and surrounding air based on evaporation of the refrigerant into an indoor space using a fan. That is, the air conditioner has a cooling function. On the other hand, the air conditioner inversely uses a refrigeration cycle of compression, evaporation, and condensation to discharge hot air generated through heat exchange between the refrigerant and surrounding air based on condensation of the refrigerant in the indoor space using the fan. That is, the air conditioner has a heating function.

The air conditioner generally includes a separable type air conditioner in which an outdoor unit and an indoor unit are separately installed or an integrated type air conditioner in which an outdoor unit and an indoor unit are integrally installed. The air conditioner further includes a multi type air conditioner in which a plurality of indoor units is connected to an outdoor unit.

In recent years, air conditioners have been installed in buildings, each of which has a plurality of independent indoor spaces, such that an air conditioner is installed in each independent indoor space. In addition, an air conditioner management system to manage the air conditioners installed in the respective independent indoor spaces in a central integration management manner has been developed.

DISCLOSURE

Technical Problem

An object of the present invention devised to solve the problem lies in an air conditioner management system that provides a user interface capable of reflecting user feedback regarding operation of an air conditioner instead of a user directly adjusting a set value of the air conditioner and a method for controlling the air conditioner.

Another object of the present invention devised to solve the problem lies in an air conditioner management system that analyzes user feedback to decide proper operation of an air conditioner instead of a user directly deciding operation of the air conditioner and a method for controlling the air conditioner.

A further object of the present invention devised to solve the problem lies in an air conditioner management system that provides a user interface capable of providing a user with opinions of other users or information regarding energy saving and a method for controlling the air conditioner.

Technical Solution

The object of the present invention can be achieved by providing an air conditioner management system including a user interface device to provide a user interface to sense a user measure indicating a user opinion regarding operation of an air conditioner, to generate feedback data associated with the sensed user measure, and to transmit the generated feedback data and a central management device to receive and store the feedback data transmitted by the user interface device and to calculate a set value to control the air conditioner based on the received feedback data and previously stored feedback data.

The user interface may include at least one opinion menu item to display an expression indicating the user opinion. The at least one opinion menu item may include at least one selected from between a physical button and a soft button. The user interface may further include a function menu item to select a function of the air conditioner and the expression displayed by the opinion menu item may be changed according to selection of the function menu item.

The user interface may include at least one selected from among a graphical user interface (GUI), a web user interface (WUI), a command line interface (CLI), and a voice interface.

The user interface device may include at least one selected from among a control panel, a handheld remote controller, a mobile terminal, a computer system, and a digital television.

The user interface device may generate a feedback packet comprising the feedback data and transmit the generated feedback packet to the central management device and the feedback packet may further include at least one selected from between time at which the user measure has been sensed and an identifier to identify the user interface device.

The central management device may further store an identifier to identify the user interface device, zone information to indicate a zone, and zone association information to associate the identifier with the zone information.

The central management device may confirm a zone associated with the user interface device based on the zone association information and control an air conditioner located in the confirmed zone based on the calculated set value.

The central management device may calculate the set value further based on a weight.

The weight may include at least one selected from among a number-of-persons weight, a time weight, a command meaning weight, and a manager policy weight.

The weight may be changed based on time at which feedback data have been input.

The weight may be changed based on the received feedback data.

The weight may be changed based on a learning algorithm.

In another aspect of the present invention, provided herein is a method for controlling an air conditioner performed by an air conditioner management system including a user interface device and a central management device, the method including the user interface device sensing a user measure indicating a user opinion regarding operation of the air conditioner, the user interface device generating feedback data associated with the user opinion in response to sensing of the user measure, the user interface device transmitting the generated feedback data to the central management device, the central management device storing the received feedback data, and the central management device calculating a set value to control the air conditioner based on the received feedback data and previously stored feedback data.

Advantageous Effects

In an air conditioner management system and a method for controlling an air conditioner according to the present invention, a user interface used to input feedback data indicating a user opinion regarding operation of the air conditioner is provided. Consequently, it is possible to prevent any user from arbitrarily manipulating the air conditioner, thereby preventing discomfort of other users due to undesired operation of the air conditioner. In addition, a set value to control the air conditioner is calculated based on current feedback data and previous feedback data. Consequently, it is possible to decide proper operation of the air conditioner based on opinions of plural users, thereby improving satisfaction of the plural users regarding operation of the air conditioner. Furthermore, opinions of other users or information regarding energy saving are provided. Consequently, it is possible to inform the user of a proper operation course of the air conditioner.

DESCRIPTION OF DRAWINGS

The accompanying drawings, which are included to provide a further understanding of the invention, illustrate embodiments of the invention and together with the description serve to explain the principle of the invention.

In the drawings:

FIG. 9 is a view showing an embodiment of a weight management table; and

FIG. 10 is a flowchart showing processes of an exemplary embodiment of a method for controlling an air conditioner according to the present invention.

BEST MODE

Figure 1:
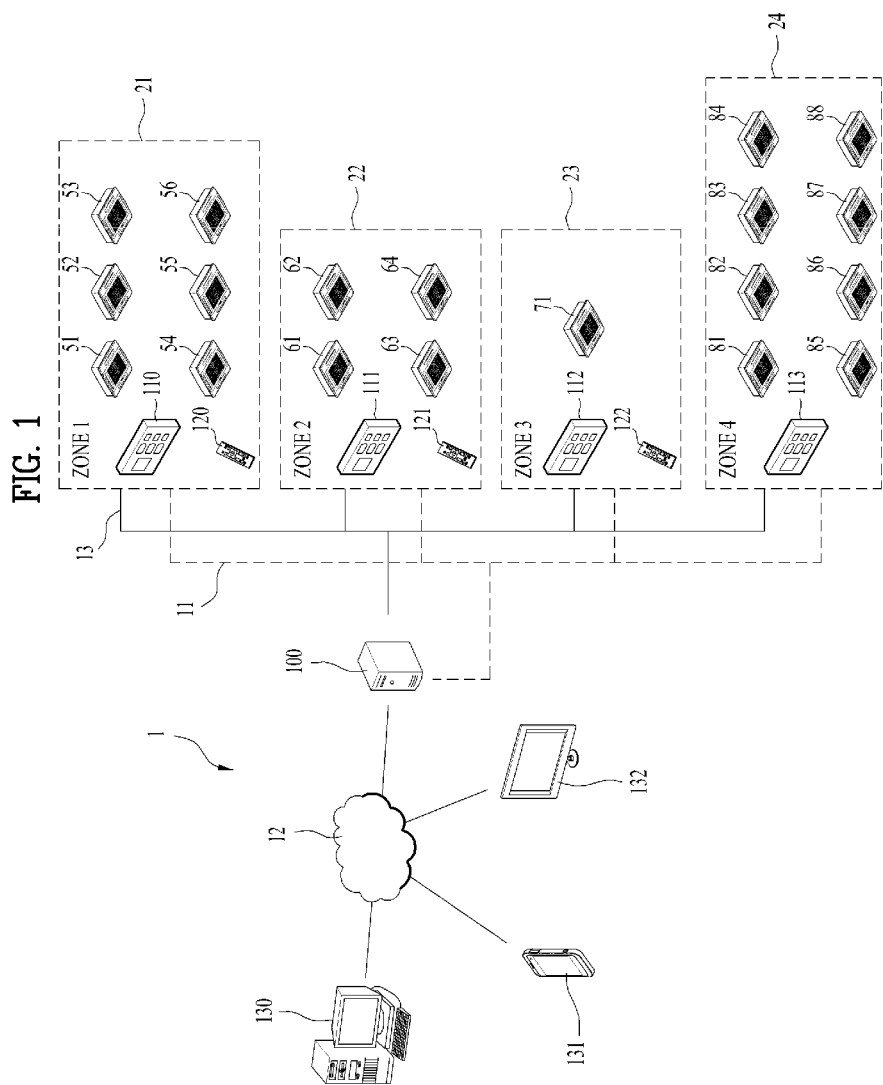
FIG. 1 is a view showing the construction of an embodiment of an air conditioner management system according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an air conditioner management system comprising a user interface device to provide a user interface to sense a user measure indicating a user opinion regarding operation of an air conditioner, to generate feedback data associated with the sensed user measure, and to transmit the generated feedback data, a central management device to receive and store the feedback data transmitted by the user interface device and to calculate a set value to control the air conditioner based on the received feedback data and previously stored feedback data.

According to the present invention, the user interface comprises at least one opinion menu item to display an expression indicating the user opinion.

According to the present invention, the at least one opinion menu item comprises at least one selected from between a physical button and a soft button.

According to the present invention, the user interface further comprises a function menu item to select a function of the air conditioner and the expression displayed by the opinion menu item is changed according to selection of the function menu item.

According to the present invention, the user interface comprises at least one selected from among a graphical user interface (GUI), a web user interface (WUI), a command line interface (CLI), and a voice interface.

According to the present invention, the user interface device comprises at least one selected from among a control panel, a handheld remote controller, a mobile terminal, a computer system, and a digital television.

According to the present invention, the user interface device generates a feedback packet comprising the feedback data and transmits the generated feedback packet to the central management device and the feedback packet further comprises at least one selected from between time at which the user measure has been sensed and an identifier to identify the user interface device.

According to the present invention, the central management device further stores an identifier to identify the user interface device, zone information to indicate a zone, and zone association information to associate the identifier with the zone information.

According to the present invention, the central management device confirms a zone associated with the user interface device based on the zone association information and controls an air conditioner located in the confirmed zone based on the calculated set value.

According to the present invention, the central management device calculates the set value further based on a weight.

According to the present invention, the weight comprises at least one selected from among a number-of-persons weight, a time weight, a command meaning weight, and a manager policy weight.

According to the present invention, the weight is changed based on time at which feedback data have been input.

According to the present invention, the weight is changed based on the received feedback data.

According to the present invention, the weight is changed based on a learning algorithm.

To further achieve these and other advantages and in accordance with the purpose of the present invention, a method for controlling an air conditioner performed by an air conditioner management system comprising a user interface device and a central management device, the method comprising the user interface device sensing a user measure indicating a user opinion regarding operation of the air conditioner, the user interface device generating feedback data associated with the user opinion in response to sensing of the user measure, the user interface device transmitting the generated feedback data to the central management device the central management device storing the received feedback data, the central management device calculating a set value to control the air conditioner based on the received feedback data and previously stored feedback data.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

FIG. 1 is a view showing the construction of an embodiment of an air conditioner management system according to the present invention.

Referring to FIG. 1, an air conditioner management system 1 according to the present invention may include a central management device 100, user interface devices 110, 111, 112, 113, 120, 121, 122, 130, 131, and 132, and air conditioners 51 to 56, 61 to 64, 71, and 81 to 88.

The user interface devices 110, 111, 112, and 113 may be connected to the central management device 100 via a first network 11. The first network 11 may be a local operating network (LONWorks), a fiber to the home (FTTH) network, an asymmetric digital subscriber line (ADSL) network, a cable network, a wireless local area network (LAN) (IEEE 802.11b, IEEE 802.11a, IEEE 802.11g, and IEEE 802.11n), a wireless broadband (WiBro) network, a worldwide interoperability for microwave access (Wimax) network, and a high speed downlink packet access (HSDPA) network.

The user interface devices 130, 131, and 132 may be connected to the central management device 100 via a second network 12. The second network 12 may include a backbone network and a subscriber network. The backbone network may include one or more integrated networks selected from among an X.25 network, a frame relay network, an asynchronous transfer mode (ATM) network, a multi protocol label switching (MPLS) network, and a generalized multi protocol label switching (GMPLS) network. The subscriber network may be a fiber to the home (FTTH) network, an asymmetric digital subscriber line (ADSL) network, a cable network, a wireless LAN (IEEE 802.11b, IEEE 802.11a, IEEE 802.11g, and IEEE 802.11n), a wireless broadband (WiBro) network, a worldwide interoperability for microwave access (Wimax) network, and a high speed downlink packet access (HSDPA) network. In some embodiments, the second network 12 may be the Internet or a mobile communication network.

The air conditioners 51 to 56, 61 to 64, 71, and 81 to 88 may be connected to the central management device 100 via a third network 13. The third network 13 may be a local operating network (LONWorks), a fiber to the home (FTTH) network, an asymmetric digital subscriber line (ADSL) network, a cable network, a wireless LAN (IEEE 802.11b, IEEE 802.11a, IEEE 802.11g, and IEEE 802.11n), a wireless broadband (WiBro) network, a worldwide interoperability for microwave access (Wimax) network, and a high speed downlink packet access (HSDPA) network.

The first network 11, the second network 12, and the third network 13 may be identical communication type networks or different communication type networks. In addition, the first network 11, the second network 12, and the third network 13 may be an integrated network or physically separated networks.

The user interface devices 120, 121, and 122 may be connected to the central management device 100 via a wireless network. In addition, the user interface devices 120, 121, and 122 may be connected to the central management device 100 via an access point associated with at least one selected from among the first network 11, the second network 12, and the third network 13. In addition, the user interface devices 120, 121, and 122 may be connected to the user interface devices 110, 111, 112, 113, 130, 131, and 132 and the air conditioners 51 to 56, 61 to 64, 71, and 81 to 88 via a wireless network. In this case, the user interface devices 110, 111, 112, 113, 130, 131, and 132 and the air conditioners 51 to 56, 61 to 64, 71, and 81 to 88 may function as relays to transmit data received from the user interface devices 120, 121, and 122 to the central management device 100 and to transmit data received from the central management device 100 to the user interface devices 120, 121, and 122.

The user interface devices 110, 111, 112, 113, 120, 121, 122, 130, 131, and 132 may include at least one selected from among a control panel, a handheld remote controller, a mobile terminal, a computer system, and a digital television. The user interface devices 110, 111, 112, and 113 are control panels and the user interface devices 120, 121, and 122 are handheld remote controllers. In addition, the user interface device 130 is a computer system, the user interface device 131 is a mobile terminal, and the user interface device 132 is a digital television.

The user interface devices 110, 111, 112, 113, 120, 121, 122, 130, 131, and 132 provide a user interface to sense a user measure indicating a user opinion regarding operation of the air conditioners 51 to 56, 61 to 64, 71, and 81 to 88. The user measure may include selection of a physical button of a user interface device, performance of a predetermined gesture on a touchscreen display or selection of a soft button and performance of a predetermined gesture recognized from an image captured by an imaging device, and performance of predetermined speech recognized by voice recognition. The gesture may include a touch gesture and a spatial gesture.

The user interface may include at least one opinion menu item to display an expression indicating a user opinion. The expression may include at least one selected from among "dry," "wet," "good," "hot," and "cold." In addition, the expression may include a term indicating a user opinion and an adverb indicating a degree or quantity thereof, for example "a little hot," "very hot," "a little cold," or "very cold." The at least one opinion menu item may include at least one selected from between a physical button and a soft button.

The user interface may further include a function menu item to select a function of an air conditioner. According to selection of the function menu item, the expression displayed by the opinion menu item may be changed.

The user interface may include at least one selected from among a graphical user interface (GUI), a web user interface (WUI), a command line interface (CLI), and a voice interface. A user may select (click) a menu item provided by the graphical user interface to input his or her opinion to a user interface device. The user may select (click) a menu item provided by the web user interface displayed on a web browser to input his or her opinion to a user interface device. The user may directly type an expression indicating his or her opinion in the command line interface using a keyboard to input his or her opinion. The user may express his or her opinion verbally. His or her opinion expressed verbally may be input to a user interface device through the voice interface.

The user interface devices 110, 111, 112, 113, 120, 121, 122, 130, 131, and 132 generate feedback data associated with the user measure sensed by the user interface and transmit the generated feedback data. The user interface devices 110, 111, 112, 113, 120, 121, 122, 130, 131, and 132 may further transmit input time or an identifier indicating time at which the user measure has been sensed or time at which the feedback data have been generated. The identifier may be an identifier or identification (ID) to identify a user interface device having generated the feedback data or an identifier to identify a zone in which a user interface device is located. In addition, the identifier may be an identifier selected by the user. The central management device 100 may confirm or select an air conditioner to be controlled based on the identifier.

The user interface devices 110, 111, 112, 113, 120, 121, 122, 130, 131, and 132 may generate a feedback packet including feedback data and transmit the generated feedback packet to the central management device 100. The feedback packet may include at least one selected from among feedback data, time at which a user measure has been sensed, and an identifier.

The central management device 100 receives and stores the feedback data transmitted by the user interface devices 110, 111, 112, 113, 120, 121, 122, 130, 131, and 132. The feedback data may be stored in a feedback data table. In addition, the central management device 100 may receive the feedback packet transmitted by the user interface devices 110, 111, 112, 113, 120, 121, 122, 130, 131, and 132. Information contained in the feedback packet may be stored in the feedback data table.

The central management device 100 calculates a set value to control an air conditioner based on currently received feedback data and previously stored feedback data (or previously received feedback data). The central management device 100 may calculate the set value further based on a weight. The weight may include at least one selected from among a number-of-persons weight, a time weight, a command meaning weight, and a manager policy weight. The number-of-persons weight means a weight imposed according to the number of users having input feedback data. The users having input the feedback data mean users having given opinions associated with the feedback data. The time weight means a weight imposed according to time at which a user measure has been sensed or time at which feedback data have been generated. The command meaning weight means a weight imposed according to type of feedback data. The manager policy weight means a weight imposed according to manager policy.

The number-of-persons weight, the time weight, the command meaning weight, and the manager policy weight may be stored in a weight table.

The weight may be changed based on time at which a user measure has been sensed or time at which feedback data have been generated. The weight may be changed based on the received feedback data. Alternatively, the weight may be changed based on a learning algorithm.

The central management device 100 may further store identifiers to identify user interface devices, zone information to indicate zones, and zone association information to associate the identifiers with the zone information. The zone association information may be a table. For example, the identifiers and the zone information may be stored in a zone management table and the zone association information may be the zone management table. The zone may mean any one selected from among zone 1 (denoted by 21), zone 2 (denoted by 22), zone 3 (denoted by 23), and zone 4 (denoted by 24) shown in FIG. 1.

The central management device 100 may confirm a zone associated with a user interface device transmitting the feedback data based on the zone association information and control air conditioners located in the confirmed zone based on the calculated set value. For example, in a case in which the user interface device 110 has transmitted feedback data, the central management device 100 may confirm that the zone associated with the user interface device 110 is zone 1 (21) based on the zone association information and confirm or select the air conditioners 51 to 56 located in zone 1 (21) as objects to be controlled.

Figure 2:
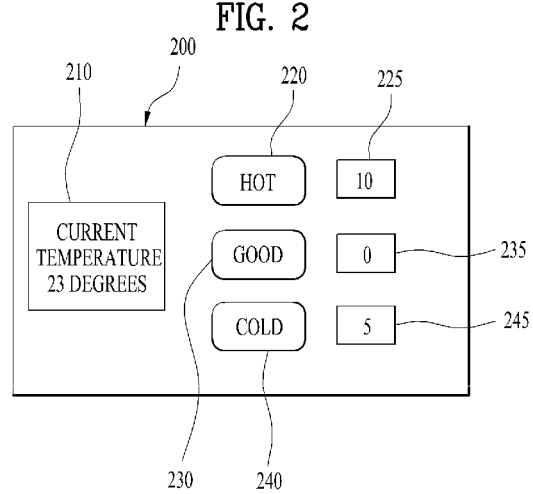
FIG. 2 is a view showing an embodiment of a user interface of an air conditioner according to the present invention.

FIG. 2 is a view showing an embodiment of a user interface of an air conditioner according to the present invention.

Referring to FIG. 2, a user interface 200 includes an information display area 210, opinion menu items 220, 230, and 240, and user opinion areas 225, 235, and 245.

The information display area 210 displays at least one selected from among information regarding current temperature, information regarding current humidity, information regarding a set value of the air conditioner, information regarding manager policy, and information regarding energy saving.

The opinion menu item 220 displays a user opinion of "hot," the opinion menu item 230 displays a user opinion of "good," and the opinion menu item 240 displays a user opinion of "cold." A user may select the opinion menu item 220 to input his or her opinion indicating that he or she feels hot during operation of the air conditioner, may select the opinion menu item 230 to input his or her opinion indicating that he or she feels good during operation of the air conditioner, or may select the opinion menu item 240 to input his or her opinion indicating that he or she feels cold during operation of the air conditioner.

The user opinion areas 225, 235, and 245 display user opinions regarding the air conditioner. The user opinion area 225 displays the number of users having given an opinion of "hot," the user opinion area 235 displays the number of users having given an opinion of "good," and the user opinion area 245 displays the number of users having given an opinion of "cold."

Figure 3:
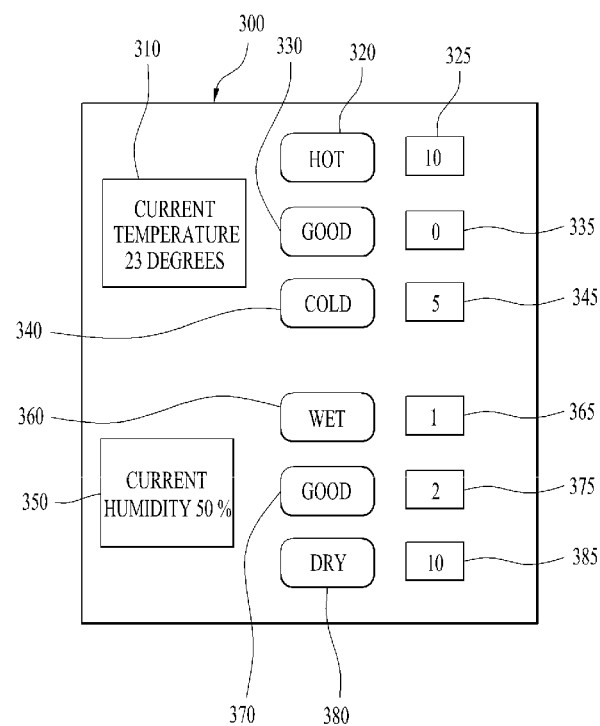
FIG. 3 is a view showing another embodiment of the user interface of the air conditioner according to the present invention.

FIG. 3 is a view showing another embodiment of the user interface of the air conditioner according to the present invention.

Referring to FIG. 3, a user interface 300 includes a first information display area 310, a second information display area 350, opinion menu items 320, 330, 340, 360, 370, and 380, and user opinion areas 325, 335, 345, 365, 375, and 385. The user interface 300 provides opinion menu items regarding a plurality of functions of the air conditioner. The opinion menu items 320, 330, and 340 are opinion menu items associated with a temperature control function of the air conditioner and the opinion menu items 360, 370, and 380 are opinion menu items associated with a humidity control function of the air conditioner.

The first information display area 310 displays information regarding a function of the air conditioner associated with temperature. For example, the first information display area 310 displays at least one selected from among information regarding current temperature, information regarding a set value of the air conditioner with respect to temperature, information regarding manager policy with respect to temperature, and information regarding energy saving related to temperature.

The opinion menu items 320, 330, and 340 include expressions indicating user opinions regarding a function of the air conditioner associated with temperature. The opinion menu item 320 displays a user opinion of "hot," the opinion menu item 330 displays a user opinion of "good," and the opinion menu item 340 displays a user opinion of "cold."

The user opinion areas 325, 335, and 345 display user opinions regarding a function of the air conditioner associated with temperature. The user opinion area 325 displays the number of users having given an opinion of "hot," the user opinion area 335 displays the number of users having given an opinion of "good," and the user opinion area 345 displays the number of users having given an opinion of "cold."

The second information display area 350 displays information regarding a function of the air conditioner associated with humidity. For example, the second information display area 350 displays at least one selected from among information regarding current humidity, information regarding a set value of the air conditioner with respect to humidity, information regarding manager policy with respect to humidity, and information regarding energy saving related to humidity.

The opinion menu items 360, 370, and 380 include expressions indicating user opinions regarding a function of the air conditioner associated with humidity. The opinion menu item 360 displays a user opinion of "wet," the opinion menu item 370 displays a user opinion of "good," and the opinion menu item 380 displays a user opinion of "dry."

The user opinion areas 365, 375, and 385 display user opinions regarding a function of the air conditioner associated with humidity. The user opinion area 365 displays the number of users having given an opinion of "wet," the user opinion area 375 displays the number of users having given an opinion of "good," and the user opinion area 385 displays the number of users having given an opinion of "dry."

Figure 4:
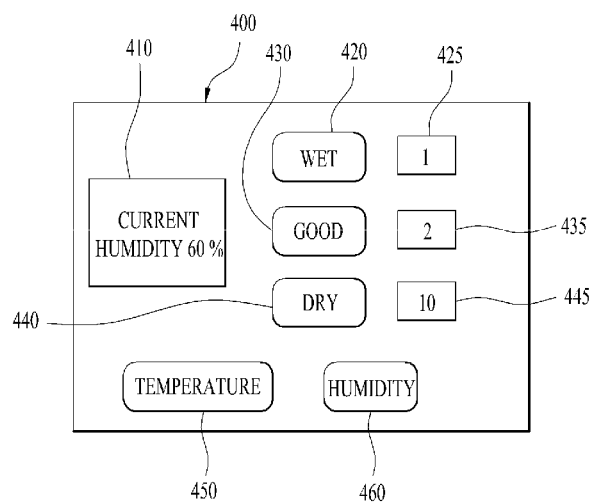
FIG. 4 is a view showing a further embodiment of the user interface of the air conditioner according to the present invention.

FIG. 4 is a view showing a further embodiment of the user interface of the air conditioner according to the present invention.

Referring to FIG. 4, a user interface 400 includes an information display area 410, opinion menu items 420, 430, and 440, user opinion areas 425, 435, and 445, and function menu items 450 and 460. Each of the function menu items 450 and 460 is provided to select a function of the air conditioner. The function menu item 450 is provided to select a temperature control function of the air conditioner and the function menu item 460 is provided to select a humidity control function of the air conditioner.

In a case in which a user selects the function menu item 450, as shown in FIG. 4, the user interface 400 displays the information display area 410, the opinion menu items 420, 430, and 440, and the user opinion areas 425, 435, and 445. The information display area 410, the opinion menu items 420, 430, and 440, and the user opinion areas 425, 435, and 445 correspond to the first information display area 310, the opinion menu items 320, 330, and 340, and the user opinion areas 325, 335, and 345 and, therefore, a detailed description thereof will be omitted.

In a case in which the user selects the function menu item 460, the information display area 410, the opinion menu items 420, 430, and 440, and the user opinion areas 425, 435, and 445 shown in FIG. 4 are changed to the second information display area 350, the opinion menu items 360, 370, and 380, and the user opinion areas 365, 375, and 385 shown in FIG. 3.

Figure 5:
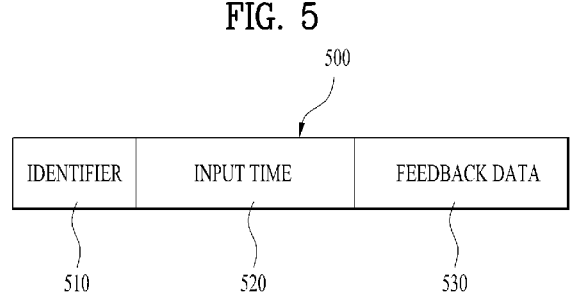
FIG. 5 is a view showing an exemplary embodiment of the structure of a feedback packet.

FIG. 5 is a view showing an exemplary embodiment of the structure of a feedback packet.

Referring to FIG. 5, a feedback packet 500 may include an identifier field 510, an input time field 520, and a feedback data field 530.

The identifier field 510 includes an identifier. The identifier may be an identifier to identify a user interface device having generated feedback data or an identifier to identify a zone in which a user interface device is located. In addition, the identifier may be an identifier selected by a user through a user interface.

The input time field 520 includes time at which a user measure has been sensed or time at which feedback data have been generated.

The feedback data field 530 includes feedback data. The feedback data may be a code value associated with the sensed user measure.

Figure 6:
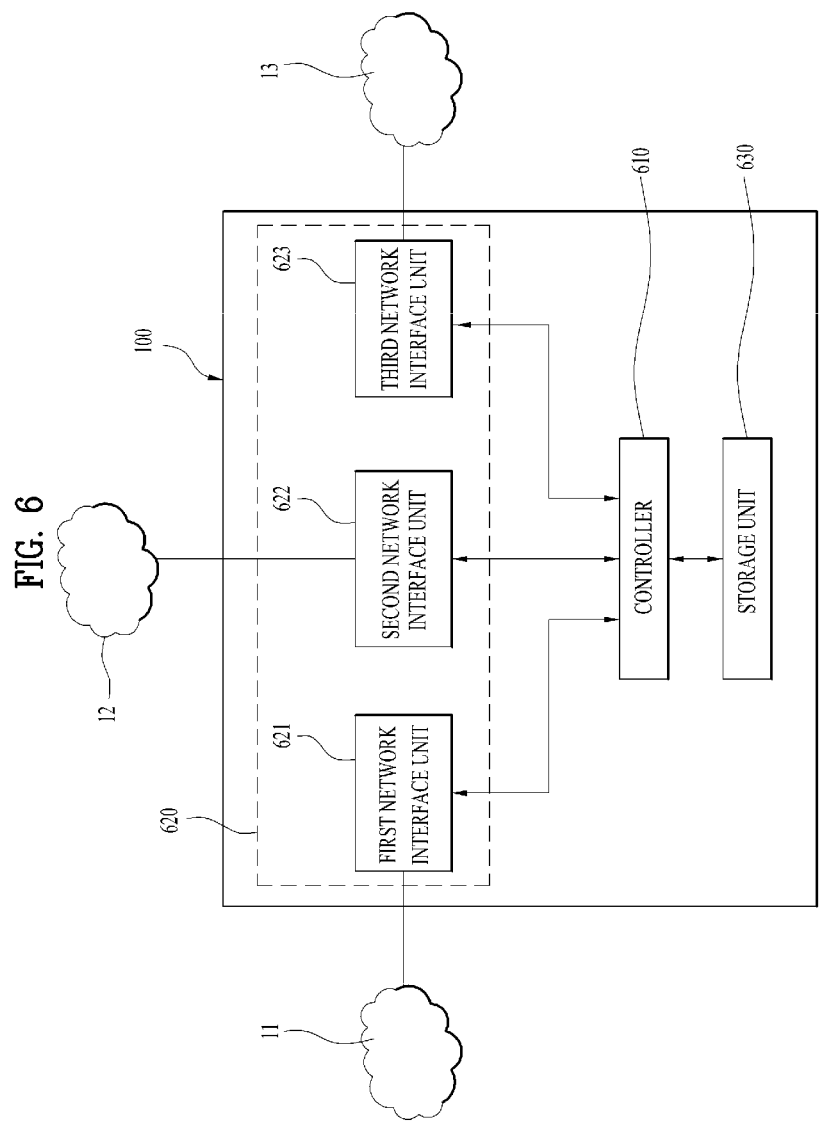
FIG. 6 is a block diagram showing the construction of an exemplary embodiment of a central management device according to the present invention.

FIG. 6 is a block diagram showing the construction of an exemplary embodiment of the central management device according to the present invention.

Referring to FIG. 6, the central management device 100 may include a controller 610, a network interface unit 620, and a storage unit 630.

The network interface unit 620 may include a first network interface unit 621, a second network interface unit 622, and a third network interface unit 623. The network interface unit 620 transmits and receives data to and from the user interface devices 110, 111, 112, 113, 120, 121, 122, 130, 131, and 132 and the air conditioners 51 to 56, 61 to 64, 71, and 81 to 88. The network interface unit 620 may receive at least one selected from among feedback data, input time, and an identifier from the user interface devices 110, 111, 112, 113, 120, 121, 122, 130, 131, and 132 and may receive a feedback packet from the user interface devices 110, 111, 112, 113, 120, 121, 122, 130, 131, and 132. In addition, the network interface unit 620 may transmit data or programs providing user interfaces to the user interface devices 110, 111, 112, 113, 120, 121, 122, 130, 131, and 132 and may transmit information displayed by the user interfaces to the user interface devices 110, 111, 112, 113, 120, 121, 122, 130, 131, and 132.

The first network interface unit 621 is connected to the first network 11. The first network interface unit 621 transmits and receives data to and from the user interface devices 110, 111, 112, and 113 via the first network 11.

The second network interface unit 622 is connected to the second network 12. The second network interface unit 622 transmits and receives data to and from the user interface devices 130, 131, and 133 via the second network 12.

The third network interface unit 623 is connected to the third network 13. The third network interface unit 623 transmits and receives data to and from the air conditioners 51 to 56, 61 to 64, 71, and 81 to 88 via the third network 13. The third network interface unit 623 may receive set values of the air conditioners or information sensed by the air conditioners from the air conditioners 51 to 56, 61 to 64, 71, and 81 to 88 and may transmit control signals to control the air conditioners to the air conditioners 51 to 56, 61 to 64, 71, and 81 to 88. The control signals may change the set values of the air conditioners.

The controller 610 executes program code together with an operating system and generates and uses data. The operating system is generally well known and, therefore, a detailed description thereof will be omitted. For example, the operating system may be a Window OS, Unix, Linux, Palm OS, DOS, Android, or Macintosh. The operating system, other computer codes, and data may be stored in the storage unit 630 operatively connected to the controller 610.

The controller 610 may be embodied on a single chip, a plurality of chips, or a plurality of electrical parts. For example, various architectures, such as a dedicated or embedded processor, a single purpose processor, a controller, and an application-specific integrated circuit (ASIC), may be used as the controller 610.

The controller 610 calculates a set value to control the air conditioner based on currently received feedback data and previously stored feedback data. The controller 610 calculates a set value to control the air conditioner based on currently received feedback data, previously stored feedback data, and a weight. The weight may include at least one selected from among a number-of-persons weight, a time weight, a command meaning weight, and a manager policy weight.

The controller 610 may apply the weight differently based on time at which feedback data have been input to calculate the set value to control the air conditioner.

The controller 610 may change the weight based on the feedback data. Alternatively, the controller 610 may change the weight based on a learning algorithm. The weight used to calculate the set value to control the air conditioner at the previous step may be changed based on feedback data received at the current step and the set value to control the air conditioner may be calculated based on the changed weight.

The controller 610 may confirm or select air conditioners to be controlled based on identifiers transmitted by the user interface devices 110, 111, 112, 113, 120, 121, 122, 130, 131, and 132. The controller 610 may detect a zone associated with the identifiers based on the zone association information stored in the storage unit 630 and confirm or select air conditioners located in the detected zone as objects to be controlled.

The storage unit 630 provides a space to store program code and data generally used by the central management device 100.

The storage unit 630 stores feedback data, input time, and identifiers received from the user interface devices 110, 111, 112, 113, 120, 121, 122, 130, 131, and 132. In addition, the storage unit 630 stores information contained in feedback packets received from the user interface devices 110, 111, 112, 113, 120, 121, 122, 130, 131, and 132. In some embodiments, the storage unit 630 may store a feedback data table including feedback data, input time, and identifiers.

The storage unit 630 may further store identifiers to identify the user interface devices, zone information to indicate zones, and zone association information to associate the identifiers with the zone information. In some embodiments, the storage unit 630 may store a zone management table storing the identifiers and the zone information.

The storage unit 630 may store at least one selected from among a number-of-persons weight, a time weight, a command meaning weight, and a manager policy weight. In some embodiments, the storage unit 630 may store a weight management table storing the number-of-persons weight, the time weight, the command meaning weight, and the manager policy weight.

The storage unit 630 may be embodied as a read only memory (ROM), a random access memory (RAM), or a hard disk drive. Program code and data may be stored in a separable storage medium and may be loaded or installed in the central management device 100 as needed. The separable storage medium may include a compact disc read only memory (CD-ROM), a personal computer card (PC-CARD), a memory card, a floppy disk, a magnetic tape, and a network component.

Figure 7:
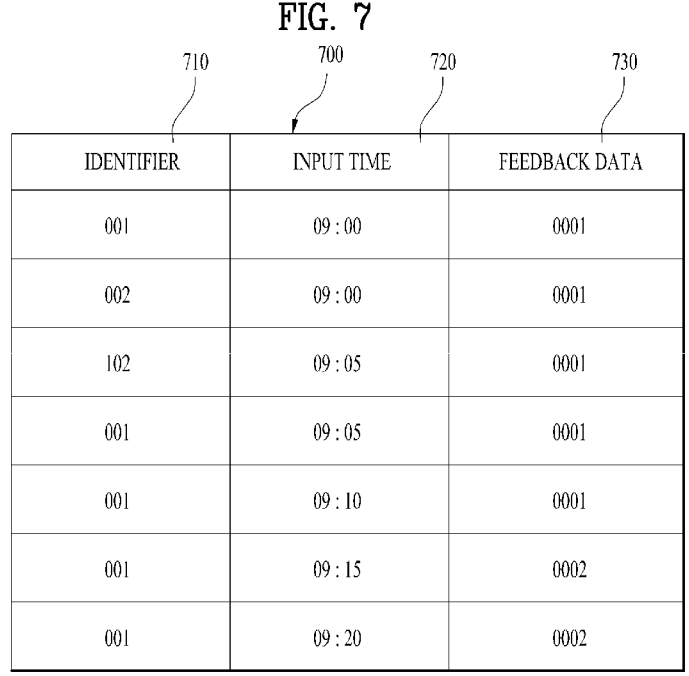
FIG. 7 is a view showing an embodiment of a feedback data table.

FIG. 7 is a view showing an embodiment of a feedback data table.

Referring to FIG. 7, a feedback data table 700 includes an identifier attribute 710, an input time attribute 720, and a feedback data attribute 730. The feedback data table 700 stores information contained in a received feedback packet as a record (or row).

The identifier attribute 710 stores identifiers included in the feedback packet.

The input time attribute 720 stores input time included in the feedback packet.

The feedback data attribute 730 stores feedback data included in the feedback packet.

For example, upon receiving a feedback packet including an identifier field of '001,' an input time field of '09:20,' and a feedback data field of '0002,' the controller 610 stores '001,' '09:20,' and '0002' are respectively stored in an identifier attribute, an input time attribute, and a feedback data attribute on a seventh row of the feedback data table 700.

Figure 8:
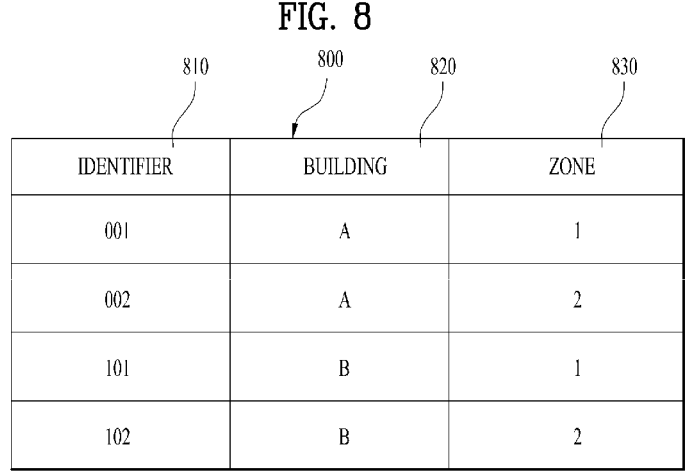
FIG. 8 is a view showing an embodiment of a zone management table.

FIG. 8 is a view showing an embodiment of a zone management table.

Referring to FIG. 8, a zone management table 800 includes an identifier attribute 810, a building attribute 820, and a zone attribute 830.

The identifier attribute 810 stores identifiers.

The building attribute 820 stores information indicating buildings. The information may include at least one selected from among a building name, a building code, and a building number. In FIG. 8, A and B indicate building names.

The zone attribute 830 stores information indicating zones. The information may include at least one selected from among a zone name, a zone code, and a zone number. In FIGS. 8, 1 and 2 indicate zone numbers of each building in a specific zone.

The controller 610 may retrieve a zone associated with an identifier included in a feedback packet from the zone management table 800 and confirm or select air conditioners installed in the retrieved zone as objects to be controlled. For example, in a case in which the identifier included in the feedback packet is '002,' the controller 610 may retrieve a row (or record) in which '002' is located from zone management table 800 and confirm a value 'A' stored in the building attribute located on the retrieved row and a value '2' stored in the zone attribute located on the retrieved row, thereby detecting that the zone associated with identifier '002' is zone 2 of building A.

FIG. 9 is a view showing an embodiment of a weight management table.

Referring to FIG. 9, a weight management table 900 stores weight rules A, B, C, and D for a number-of-persons weight, a time weight, a command meaning weight, and a manager policy weight. The weight rules A, B, C, and D may be rules to prescribe weights or specific numerical values.

The controller 610 may adjust or change weights stored in the weight management table 900 based on received feedback data. For example, in a case in which currently received feedback data are the same as previously received feedback data, the controller 610 may adjust the weight rules such that the time weight is more applied to the currently received feedback data. On the other hand, in a case in which the currently received feedback data indicate a user opinion different from that of the previously received feedback data, the controller 610 may adjust the weight rules such that the time weight is less applied to the currently received feedback data.

In a case in which the currently received feedback data are the same as feedback data input by a large number of users, the controller 610 may adjust the weight rules such that the number-of-persons weight is more applied to the feedback data input by the large number of users. On the other hand, in a case in which the currently received feedback data are the same as feedback data input by a small number of users, the controller 610 may adjust the weight rules such that the number-of-persons weight is more applied to the feedback data input by the small number of users.

FIG. 10 is a flowchart showing processes of an exemplary embodiment of a method for controlling an air conditioner according to the present invention.

Referring to FIG. 10, a user interface device 110 senses a user measure indicating a user opinion regarding operation of the air conditioner (S100). The user measure may be sensed through the user interface 200 shown in FIG. 2, the user interface 300 shown in FIG. 3, or the user interface 400 shown in FIG. 4.

In response to sensing of the user measure, the user interface device 110 generates feedback data associated with the user opinion (S110). At this time, the user interface device 110 may generate a feedback packet including feedback data. The feedback packet may be the feedback packet 500 shown in FIG. 5.

The user interface device 110 transmits the generated feedback data to a central management device 100 (S120). At this time, the user interface device 110 may further transmit an identifier and input time. Alternatively, the user interface device 110 may transmit the feedback packet. In addition, the user interface device 110 may receive the feedback data, the identifier, and the input time. Alternatively, the user interface device 110 may receive the feedback packet.

The central management device 100 stores the received feedback data (S130). At this time, the central management device 100 may store the received feedback data in the feedback data table 700 shown in FIG. 7. In a case in which the feedback packet is received, the central management device 100 may store information contained in the received feedback packet in the feedback data table 700.

The central management device 100 selects an air conditioner to be controlled (S140). The central management device 100 may select an air conditioner to be controlled based on an identifier included in the feedback packet. In some embodiments, the central management device 100 may select an air conditioner to be controlled using the zone management table 800 shown in FIG. 8.

The central management device 100 calculates a set value to control the air conditioner based on currently received feedback data and previously stored feedback data (S150). The central management device 100 may calculate the set value based on a weight. The weight may be stored in the weight management table 900 shown in FIG. 9.

Step S150 may further include a step of the central management device 100 changing the weight based on the currently received feedback data. The weight may be changed based on the mode described with reference to FIG. 9 or a learning algorithm. The changed weight may be used to calculate the set value or to calculate a set value at a subsequent step.

The central management device 100 controls the selected air conditioner based on the calculated set value (S160).

The method for controlling the air conditioner according to the present invention may be realized as code, which is readable by a processor included in a mobile terminal, in recording media readable by the processor. The recording media readable by the processor includes all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that a code readable by the processor is stored or executed in a distributed manner.

INDUSTRIAL APPLICABILITY

In an air conditioner management system and a method for controlling an air conditioner according to the present invention, a user interface used to input feedback data indicating a user opinion regarding operation of the air conditioner is provided. Consequently, it is possible to prevent any user from arbitrarily manipulating the air conditioner, thereby preventing discomfort of other users due to undesired operation of the air conditioner. In addition, a set value to control the air conditioner is calculated based on current feedback data and previous feedback data. Consequently, it is possible to decide proper operation of the air conditioner based on opinions of plural users, thereby improving satisfaction of the plural users regarding operation of the air conditioner. Furthermore, opinions of other users or information regarding energy saving are provided.

Consequently, it is possible to inform the user of a proper operation course of the air conditioner. Therefore, the present invention has industrial applicability.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An air conditioner management system comprising:
a plurality of user interface devices, a plurality of air conditioners located in a plurality of zones, and a central management device,
wherein the plurality of user interface devices are connected to the central management devices via at least one type of network,
wherein the plurality of air conditioners are connected to the central management device via a network,
wherein each of the plurality of user interface devices is associated with a corresponding one of the plurality of zones including at least one of the plurality of air conditioners,
wherein the user interface device is configured to:
display, on a display, a user interface comprising soft buttons corresponding to a first plurality of user opinion menu items associated with a current temperature such that one of the first plurality of user opinion menu items is selectable by a user providing an opinion expressing the current temperature as "hot," "good," or "cold,"
wherein the user interface further comprises:
an information display area displaying information regarding the current temperature shown in a numerical value; and
function menu items to select a function of the air conditioner, the function menu items including a first function menu item for selecting a temperature control function and a second function menu item for selecting a humidity control function;
display, on the user interface, soft buttons corresponding to a second plurality of user opinion menu items associated with current humidity in response to a first user input selecting the second function menu item such that one of the second plurality of user opinion menu items is selectable by the user providing an opinion expressing the current humidity as "wet," "good," or "dry";
receive, via the user interface, a second user input selecting one of the first or second plurality of user opinion menu items;
display, on the display, a number of users having given a user input for each of the first or second plurality of user opinion menu items;
generate feedback data associated with the received second user input;
generate a feedback packet comprising the feedback data, a time at which the second user input has been received, an identifier to identify the user interface device having generated the feedback data, and an identifier identifying a zone in which the user interface device is located; and
transmit the generated feedback packet to the central management device via the at least one type of network, and wherein the central management device comprises a network interface unit, a storage unit, and a controller configured to:
receive the feedback packet from the user interface device via the network interface unit;
cause storing of the feedback data received from the user interface device in the storage unit;
store, in the storage unit, a feedback data table including the feedback data, the time at which the second user input has been received, and an identifier of the feedback packet;
store, in the storage unit, a weight management table including a number-of-persons weight, a time weight, a command meaning weight, and a manager policy weight that are adjustable or changeable based on the received feedback data;
calculate a set temperature or humidity value to control the at least one of the plurality of air conditioners based on at least one weight selected from the weight management table, the received feedback data and previously stored feedback data, the controlled at least one air conditioner selected from among the plurality of air conditioners based on the time at which the second user input has been received, the identified user interface device, and the identified zone; and
control the selected at least one of the plurality of air conditioners based on the calculated set temperature or humidity value.

2. The air conditioner management system according to claim 1, wherein the user interface further comprises at least one of a graphical user interface (GUI), a web user interface (WUI), a command line interface (CLI), or a voice interface.

3. The air conditioner management system according to claim 1, wherein the user interface device comprises at least one of a control panel, a handheld remote controller, a mobile terminal, a computer system, or a digital television.

4. The air conditioner management system according to claim 1, wherein the central management device is further configured to store the identifier to identify the user interface device, zone information to indicate a zone, and zone association information to associate the identifier with the zone information.

5. The air conditioner management system according to claim 4, wherein the central management device is further configured to confirm a zone associated with the user interface device based on the zone association information and control an air conditioner located in the confirmed zone based on the calculated set temperature value.

6. The air conditioner management system according to claim 1, wherein the weight is changed based on time at which the feedback data have been generated by the user interface device.

7. The air conditioner management system according to claim 1, wherein the weight is changed based on a specific learning algorithm.

8. The air conditioner management system according to claim 1, wherein the user interface device is connected to the central management device via a wireless network or an access point.

9. The air conditioner management system according to claim 1, wherein the feedback packet comprises an identifier field, an input time field, and a feedback data field.

10. The air conditioner management system according to claim 9, wherein:
the identifier of the feedback packet is included in the identifier field;

the time at which the user input has been received is included in the input time field; and the feedback data is included in the feedback data field.

11. A method for controlling an air conditioner performed by an air conditioner management system comprising a plurality of user interface devices, a plurality of air conditioners located in a plurality of zones, and a central management device, wherein the plurality of user interface devices are connected to the central management devices via at least one type of network, wherein the plurality of air conditioners are connected to the central management device via a network, wherein each of the plurality of user interface devices is associated with a corresponding one of the plurality of zones including at least one of the plurality of air conditioners, the method performed by the user interface device and comprising:

displaying a user interface on a display, the user interface comprising soft buttons corresponding to a first plurality of user opinion menu items associated with a current temperature such that one of the first plurality of user opinion menu items is selectable by a user providing an opinion expressing the current temperature as "hot," "good," or "cold,"

wherein the user interface further comprises:

an information display area displaying information regarding the current temperature shown in a numerical value; and function menu items to select a function of the air conditioner, the function menu items including a first function menu item for selecting a temperature control function and a second function menu item for selecting a humidity control function;

displaying, on the user interface, soft buttons corresponding to a second plurality of user opinion menu items associated with current humidity in response to a first user input selecting the second function menu item such that one of the second plurality of user opinion menu items is selectable by the user providing an opinion expressing the current humidity as "wet," "good," or "dry";

receiving, via the user interface, a second user input selecting one of the first or second plurality of user opinion menu items;

displaying, on the display, a number of users having given a user input for each of the first or second plurality of user opinion menu items;

generating feedback data associated with the received second user input;

generating a feedback packet comprising the feedback data, a time at which the second user input has been received, an identifier to identify the user interface device having generated the feedback data, and an identifier identifying a zone in which the user interface device is located; and transmitting the generated feedback packet to the central management device via the at least one type of network, and the method performed by the central management device comprising a network interface unit, a storage unit, and a controller, and further comprising:

causing storing of the received feedback data in the storage unit;

storing, in the storage unit, a feedback data table including the feedback data, the time at which the second user input has been received, and an identifier of the feedback packet;

storing, in the storage unit, a weight management table including a number-of-persons weight, a time weight, a command meaning weight, and a manager policy weight that are adjustable or changeable based on the received feedback data;

calculating a set temperature or humidity value to control the at least one of the plurality of air conditioners based on at least one weight selected from the weight management table, the received feedback data and previously stored feedback data, the controlled at least one air conditioner selected from among the plurality of air conditioners based on the time at which the second user input has been received, the identified user interface device, and the identified zone; and controlling the selected at least one of the plurality of air conditioners based on the calculated set temperature or humidity value.

* * * * *